(12) United States Patent
Ravindran et al.

(10) Patent No.: US 10,310,907 B1
(45) Date of Patent: Jun. 4, 2019

(54) COMPUTER SYSTEM PROVIDING NUMERIC CALCULATIONS WITH LESS RESOURCE USAGE

(71) Applicant: XACTLY CORPORATION, San Jose, CA (US)

(72) Inventors: Gowri Shankar Ravindran, Cupertino, CA (US); Prashanthi Ramamurthy, Dublin, CA (US); Kandarp Mahadev Desai, Mountain View, CA (US)

(73) Assignee: Xactly Corporation, San Jose, CA (US)

( * ) Notice: Subject to any disclaimer, the term of this patent is extended or adjusted under 35 U.S.C. 154(b) by 0 days.

(21) Appl. No.: 15/977,939

(22) Filed: May 11, 2018

(51) Int. Cl.
*G06F 9/46* (2006.01)
*G06F 9/50* (2006.01)
*G06F 17/10* (2006.01)
*G06F 16/27* (2019.01)
*G06F 16/901* (2019.01)

(52) U.S. Cl.
CPC ............ *G06F 9/5038* (2013.01); *G06F 16/27* (2019.01); *G06F 16/9024* (2019.01); *G06F 17/10* (2013.01)

(58) Field of Classification Search
None
See application file for complete search history.

(56) References Cited

U.S. PATENT DOCUMENTS

| 2009/0007127 A1* | 1/2009 | Roberts ................. G06F 9/5066 718/104 |
| 2016/0188385 A1* | 6/2016 | Ekanadham ...... G06F 17/30958 719/328 |

OTHER PUBLICATIONS ("Who's Using Amazon Web Services?", Benjamin Wootton, Jan. 26, 2017 (Year: 2017).*

* cited by examiner

*Primary Examiner* — Wissam Rashid
(74) *Attorney, Agent, or Firm* — Hickman Palermo Becker Bingham LLP

(57) ABSTRACT

A data processing method includes receiving a request to perform a calculation, identifying, based on the request, data items needed to perform the calculation and retrieving the data items from a data store, storing, in memory, the items, generating graphs for the calculation, wherein each graph comprises one or more nodes, each node comprising instructions to perform at least a portion of the calculation and at least one data item needed by the portion of the calculation, executing each of the graphs to generate a result for the calculation by traversing the graph and processing each node using the instructions of the node and the at least one data item of the node, wherein executing is performed without accessing the data store, and storing, in the data store, the result.

16 Claims, 5 Drawing Sheets

COMPUTER SYSTEM PROVIDING NUMERIC CALCULATIONS WITH LESS RESOURCE USAGE

FIELD OF THE DISCLOSURE

The present disclosure generally relates to the technical fields of digital computing devices and data analytics. Another technical field is programming techniques for digital computers relating to providing a generalized flexible calculation framework that permits specifying and executing numeric data calculations with a digital computer using fewer resources such as CPU, memory and storage. Embodiments generally relate to improved methods, computer software, and/or computer hardware in the field of data analysis including computer-implemented techniques for providing a generalized and flexible calculation framework that improves the speed and efficiency with which analytics may be performed.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Increases in hardware and software support costs have given way to a new technology delivery model in which software is delivered as a service, commonly abbreviated as "SaaS." Typically, in SaaS, a company that created or manages the software application licenses the software application to tenants on a subscription basis. The software itself is typically centrally hosted and accessed by users using a thin client, such as a web browser. One of many popular uses for SaaS is data analytics. Tenants may upload or otherwise make their data accessible to the SaaS, and subsequently access the data for various data mining or data aggregation operations required to perform various analytics, such as determining particular trends related to enterprise operations. "Analytics," in this context, refers to calculations that are performed on large datasets and/or using complex algorithms that seek to find trends, correlations or other meaning in the datasets.

These analytics may take a long time to perform even with high-speed computers and contemporary database architectures. When processing analytics takes a long time, the computers and databases involved in the analytics may be available for fewer other operations or available later in time. Long computation times also typically indicate the use of large amounts of buffer memory and/or scratchpad data storage to store interim results or metadata that are necessary during computation. Therefore, long processing times ultimately result in inefficient data processing and consumption of excess processor, memory and storage resources. Further, these analytics typically take a long time to create or design, and thus may have limited flexibility in terms of what may be performed. Any improvements in reducing the time needed to perform analytics may result in reduced consumption of these machine resources and more efficient data processing. Additionally, more flexible calculations would result in a better tenant experience and allow new or different calculations to be more easily performed. Therefore, improved methods of analytics are needed.

DETAILED DESCRIPTION

Figure 1:
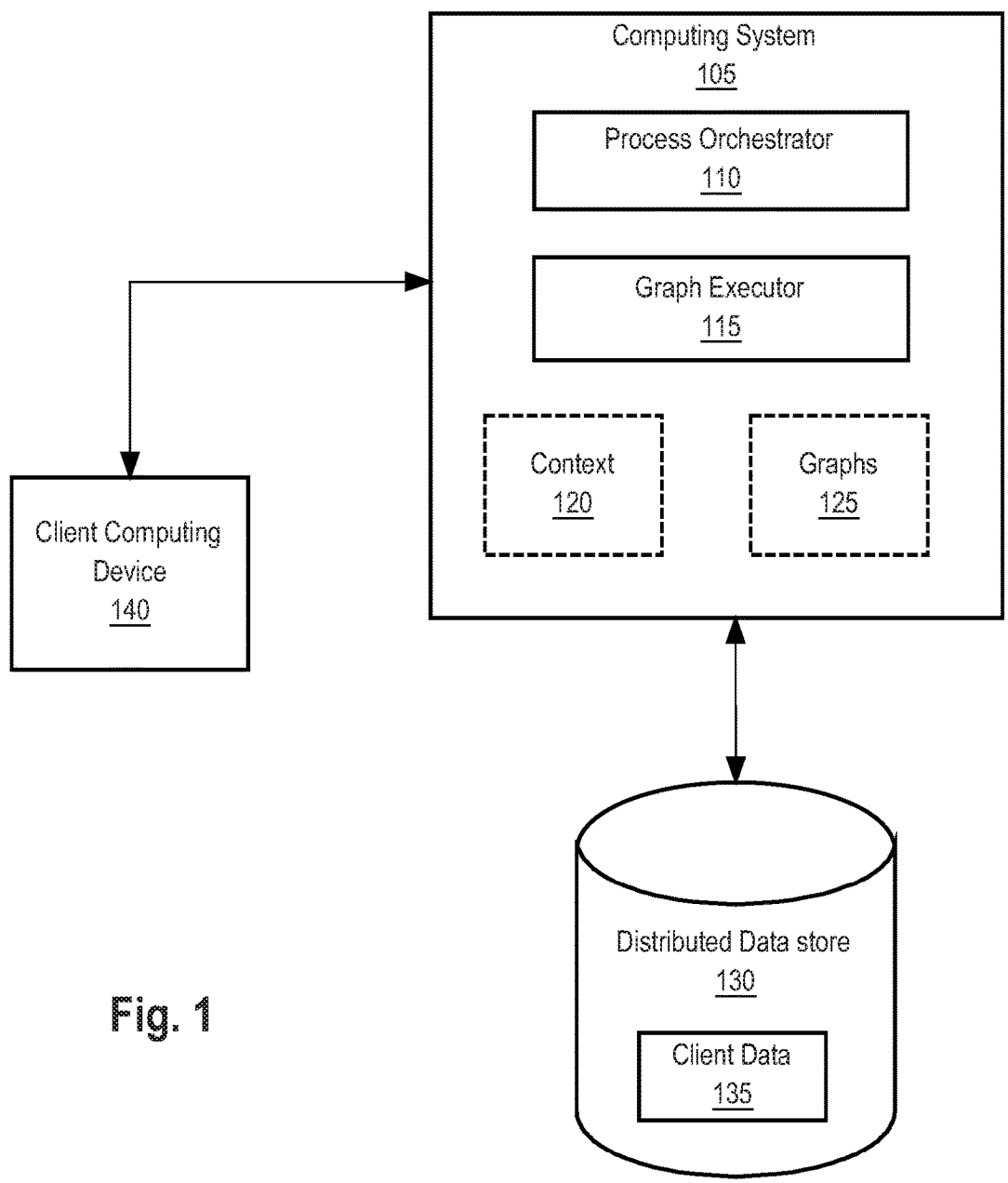
FIG. 1 illustrates an example computer system in which the techniques described herein may be practiced, in accordance with an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:

1. GENERAL OVERVIEW
2. OVERVIEW OF RELATED TECHNOLOGY AND TERMINOLOGY
3. EXAMPLE SYSTEM IMPLEMENTATION
4. EXAMPLE FUNCTIONAL IMPLEMENTATION
5. EXAMPLE CALCULATION
6. IMPLEMENTATION EXAMPLE—HARDWARE OVERVIEW
7. EXTENSIONS AND ALTERNATIVES

1. General Overview

In an embodiment, computer-implemented techniques are provided for defining numeric calculations using graph data representations in digital memory and then executing the calculations in a more efficient manner by conceptually walking the graphs in a specified way by computer. In a sense, embodiments provide a generalized flexible calculation framework. Framework, in this context, means a set of cooperating computer programs or instruction modules that can interoperate to execute specified functions by computer. The instructions permit parallel execution and reduces the consumption of machine resources such as CPU, volatile or non-volatile memory and/or persistent data storage, and enabling any calculation to easily be performed. Embodiments can be implemented in special-purpose computing devices, or programmed general-purpose computers.

In an embodiment, data items for a client computer may be digitally stored in a distributed data store. The data items may represent data of any type or size. For example, the data items may represent sales data, employee data, accounting data, rules, formulas, algorithms, reports, hierarchies, health data, equipment data, metadata, etc. The data items do not have a required format, although metadata describing the formats used may be present to assist in interpreting the data items correctly. Once stored, a client may specify the types of calculations to be performed on their data, and establish or identify any rules, formulas, or algorithms needed for any desired calculations.

At a later point, a client computer may request executing a calculation. In response to the request, preprocessing instructions execute a preprocessing phase, in which the data needed for the calculation is identified in the distributed data store, and is stored in an in-memory data store. Per-user or per-entity graphs are generated and digitally stored, based on the request and the in-memory data store. Graph, in this context, refers to stored digital data organized as a plurality of nodes that are connected by edges; nodes and edges may be represented at different addresses of memory with numeric or logical references to one another. The graphs are specific to a particular user or entity, and as many graphs as are needed for the request may be generated. Each graph comprises one or more nodes. Each node includes the executable program instructions that are needed to process or otherwise execute the node and any necessary data. Nodes may have references that link or make them dependent on other nodes in the same graph, on nodes of other graphs, or on the completion of other graphs. The result of preprocessing is a digitally stored list of one or more graphs that, once traversed using a graph traversal algorithm, will produce a result to the request.

In a processing step, all graphs of the list of graphs are traversed and executed by computer. The execution may be parallelized on multiple levels, using different CPUs, virtual machine instances or other digital computer elements. Within a particular graph, nodes that do have dependency references to other nodes may be executed in parallel, and may be executed on a same or different computing device or computing instance. Likewise, different graphs may be executed in parallel. The amount of parallel execution that is used may be determined before execution of the graphs begins. Once execution of the list of graphs has completed, the result to the request is stored in the distributed data store. In a post processing step, any of several different subsequent actions may be executed, such as visually displaying results using a computer display device, or updating data records based upon calculated values. Embodiments of the calculation instructions may be executed using public or private cloud computing instances, in various embodiments.

The generalized and flexible nature of the calculation framework, and the parallelism that the framework allows, have been found to result in significant time savings and reduced use of CPU, memory and/or other data storage resources. Furthermore, client computers or client computer applications can provide instructions to define and to perform calculations as needed, rather than being limited to what a particular software provider offers.

In an embodiment, a data processing method comprises receiving, from a client computing device and by a computing system, a request to perform a calculation, identifying, based on the request, a plurality of data items needed to perform the calculation and retrieving the plurality of data items from a data store, storing, in memory, the plurality of data items, generating a plurality of graphs for the calculation, wherein each graph of the plurality of graphs comprises one or more nodes, each node comprising instructions to perform at least a portion of the calculation and at least one data item of the plurality of data items needed by the portion of the calculation, executing each of the plurality of graphs to generate a result for the calculation by traversing the graph and processing each node using the instructions of the node and the at least one data item of the node, wherein executing is performed without accessing the data store, storing, in the data store, the result.

All values used in performing these computer-implemented techniques, including tenant data, context, rules, formulas, results, etc., may comprise data values that are digitally stored in electronic digital computer memory that is accessed, manipulated and updated using digital processors.

2. Overview of Related Technology and Terminology

In the following description reference will be made to both data stores and databases. A data store is a repository for data. Similarly, a database is structured data store. A database may be structured in any suitable way, and should not be limited by the examples provided herein. Further, while reference may be made to either a data store or database, the invention is not limited to one or the other. In other words, when a database is used to describe one embodiment of the invention, a data store may also be used. Likewise, if a data store is used to describe another embodiment, a database may also be used.

Big data environments are becoming an increasingly important aspect of all companies. The insights that can be gained by analyzing large quantities of data are invaluable. Many different methods, programs, formats, and solutions have been developed. Examples include Apache Hadoop or Apache HBase, by the APACHE SOFTWARE FOUNDATION of Forest Hill, Md., any of the technologies used or supported by MAPR TECHNOLOGIES, INC., of San Jose, Calif., JavaScript Object Notation (JSON), etc. The data stores may be a non-relational distributed database capable of handling tremendous amounts of data in an efficient manner. Although reference may be made to a particular data store, such as MapR, throughout this specification, the invention is applicable to many other database applications and/or implementations, and should not be limited to MapR.

For example, a data store may be used by many companies to store their compensation data in a shared data store coupled via networks to one or more server computers that execute instances of server-based applications that implement a multitenant service or system. While use of the applications or application instances may be shared, data is effectively segregated by tenant to prevent transfer of confidential information of tenant to another. In an embodiment, each company retains full access to its private data, and may also gain access to aggregated, anonymized data from all other tenants. Alternatively, the aggregated data may not be anonymized. The aggregated data may be made available in many different ways, and may be used by each individual company as a benchmark for use in a variety of ways, such as determining whether their employees are properly compensated.

Further, rather than maintaining a set of servers itself, a creator or manager of a software application may utilize a public cloud to provide their software application to tenants, such as Amazon Web Services (AWS), by AMAZON of Seattle, Wash., or Microsoft Azure, by MICROSOFT of Redmond, Wash. By utilizing a public cloud, a software developer removes the need to run a dedicated data center for their product, and allows rapid and large scale scaling of computing instances or containers as needed, such as when executing many graphs or nodes in parallel.

3. Example System Implementation

FIG. 1 illustrates an example computer system in which the techniques described may be practiced, according to one embodiment.

In an embodiment, a computer system comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1 illustrates computing system 105 that is coupled via a wired or wireless connection, or a combination thereof, to distribute data store 130 and client computing device 140. Computing system 105 comprises process orchestrator 110, graph executor 115, context 120, and graph 125. Distributed data store 130 comprises client data 135. The distributed data store may be implemented using a computer or computers that are independent from computing system 105, although in some embodiments both systems may be implemented as different virtualized computing instances in the same datacenter. In one embodiment, process orchestrator 110 and graph executor 115 comprise pages in digital memory that store executable instructions that are programmed to perform the functions that are described herein. In an embodiment, each of context 120 and graphs 125 comprises sets of digitally stored data having the values representing the items that are further described herein.

In one embodiment, computing system 105 may be any computing device, including but not limited to: servers, racks, nodes in a datacenter, work stations, personal computers, general purpose computers, laptops, Internet appliances, wireless devices, wired devices, multi-processor systems, mini-computers, and the like. Although FIG. 1 shows a single element, the computing system 105 broadly represents one or multiple server computers, such as a server cluster, and the server computer may be located in one or more physical locations. Computing system 105 also may represent one or more virtual computing instances that execute using one or more computers in a datacenter such as a virtual server farm. Computing system 105 may be, or include portions of, a public or private cloud, such as the aforementioned AWS. For example, computing system 105 may include one or more servers hosted by an application service provider that interacts with or directs a public cloud to perform certain tasks, such as processing or calculations. Alternatively, computing system 105 may utilize a public cloud for all processing and execution, or any other suitable distribution of work.

Computing system 105 is communicatively connected to distributed data store 130 and client computing device 140 through any kind of computer network using any combination of wired and wireless communication, including, but not limited to: a Local Area Network (LAN), a Wide Area Network (WAN), one or more internetworks such as the public Internet, or a company network. Computing system 105 may host or execute process orchestrator 110 and graph executor 115, and may include other applications, software, and other executable instructions, to facilitate various aspects of embodiments described herein.

In one embodiment, distributed data store 130 is a distributed data store that is in production and accessible by customers, such as by client computing device 140. Distributed data store 130 may include any suitable storage device such as one or more hard disk drives, memories, or any other electronic digital data recording device configured to store data. Although distributed data store 130 is shown as a single element, distributed data store 130 may span multiple devices located in one or more physical locations and may span multiple separate data stores or databases within those devices. For example, distributed data store 130 may be located on one or more nodes in a data warehouse or warehouses. Additionally, in one embodiment, distributed data store 130 may be located on the same device or devices as computing system 105. Alternatively, distributed data store 130 may be located on a separate device or devices from computing system 105. Further, distributed data store 130 may replicate or maintain multiple copies of any stored data as needed.

In one embodiment, the data store of distributed data store 130 may be of any type or format and may store any type and amount of data. For example, distributed data store 130 may be a MapR JSON based data store. Any other formats of data stores or databases may be used, such as a relation database, a NOSQL database, a columnar database, etc.

Distributed data store 130 stores client data 135. In one embodiment, client data 135 is data related to a specific client or customer of computing system 105, which may be structured as a multi-tenant system in which client data for different entities is stored together in data store 130 but subject to keying, tagging and access control procedures that permit the client computing device 140 to access only data for a particular tenant with which the client computing device is associated. Although client data 135 is depicted as a single element, there may be a private set of data for each client of computing system 105 that is accessible only by the client associated with that client data. There may be any number of clients and any number of separate client data 135. Client data 135 may relate to any type of data, such as personal information, business information, governmental data, compensation data, health data, environmental data, police/military data, etc. Client data 135 may span any time period, such as a quarter, 1 year, 3 years, 15 years, the life of the business associated with the client, or any other amount of time.

Client data 135 is accessible by the associated client at any time for modifications, calculations, analysis, export, import, or any other action. Optionally, while most of client data 135 is editable by the client, some portions thereof, such as calculated values, may not be editable by the tenant. Multiple copies of client data 135 may be replicated and stored in different locations. The copies may not be exactly the same—there may be a delay in propagating any changes made to the various copies, or different versions may be maintained. When copied, client data 135 may be reformatted or otherwise organized into different forms for any purpose. Some copies of client data 135 may be read-only, such as a copy used for analytics or other calculations or processing.

In one embodiment, client computing device 140 is one or more computing devices, including, but not limited to: work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, and the like.

Client computing device 140 may include applications, software, and/or other executable instructions to facilitate various aspects of the invention described herein. Specifically, client computing device 140 is able to send requests for accessing, adding to, deleting, or modifying client data 135, send analytics requests, receive results of analytics requests, and display the results of analytics requests, and any other functionalities needed by the present invention. In one embodiment, there may be any number of client devices, and each unique customer may include one or more devices. Client computing device 140 is communicatively connected to computing system 105 through any kind of computer network using any combination of wired and/or wireless communication, including, but not limited to: a LAN, a WAN, the Internet, a company network, etc.

Returning to computing system 105, computing system 105 executes process orchestrator 110 and graph executor 115 which, together, are responsible for storing and retrieving data, receiving requests, identifying data needed by requests, generating graphs, executing graphs, determining where to execute graphs or nodes, and displaying results. Broadly, these actions fall into pre-processing, processing, or post processing. However, before more detail about the process orchestrator 110 and graph executor 115 is given, some background about other aspects of computing system 105 will be given.

In one embodiment, computing system 105 includes context 120. Context 120 is an in-memory generic data store, and may be thought of as a container for data. Context 120 may be used for many different portions of embodiments described herein. Although a single context 120 is shown in FIG. 1, any number of contexts may exist. For example, there may be different contexts 120 on different devices of a public cloud system, each storing data needed for the calculations that will be performed on the associated device. Also, context 120 may change over time. For example, initially a context 120 may contain one data item but, during processing of a graph, an additional data item may be created that is stored in context 120 and subsequently used by another node of a graph. Context 120 may be specific to, or accessed by, a single node or a single graph. Alternatively, context 120 may be accessible to many different nodes of many different graphs. Context 120 may contain any type or amount of data. Typically, context 120 will contain data needed to perform calculations, as well as the instructions or code needed to perform the calculations.

In one embodiment, computing system 105 includes graphs 125. Graphs 125 are generated and executed by the process orchestrator 110 in conjunction with graph executor 115. A graph 125 is a set of nodes and edges. A graph 125 may contain any number of nodes and edges. Each node of a graph is a step or portion of a calculation. Each node contains, or knows how to access, data needed for the step or portion of a calculation as well as the instructions or code needed to perform the step or portion of a calculation. The nodes of a graph are linked by edges. Each edge represents a dependency of an associated node or nodes, and thus, provides guidance on the order in which nodes should be executed. By traversing a graph 125, an order for execution of the graph may be identified. Once executed, a graph 125 returns a result. Any number of graphs 125 may be generated by computing system 105. Each graph may correspond to a single user or entity. For example, if a requested calculation is to run payroll for a company with 500 employees, then 500 graphs may be generated—one for each employee. This allows for a large amount of parallel execution of graphs, as discussed below. Additionally, nodes within a single graph 125 that are not dependent on other nodes may also be executed in parallel, as also discussed below.

Figure 2:
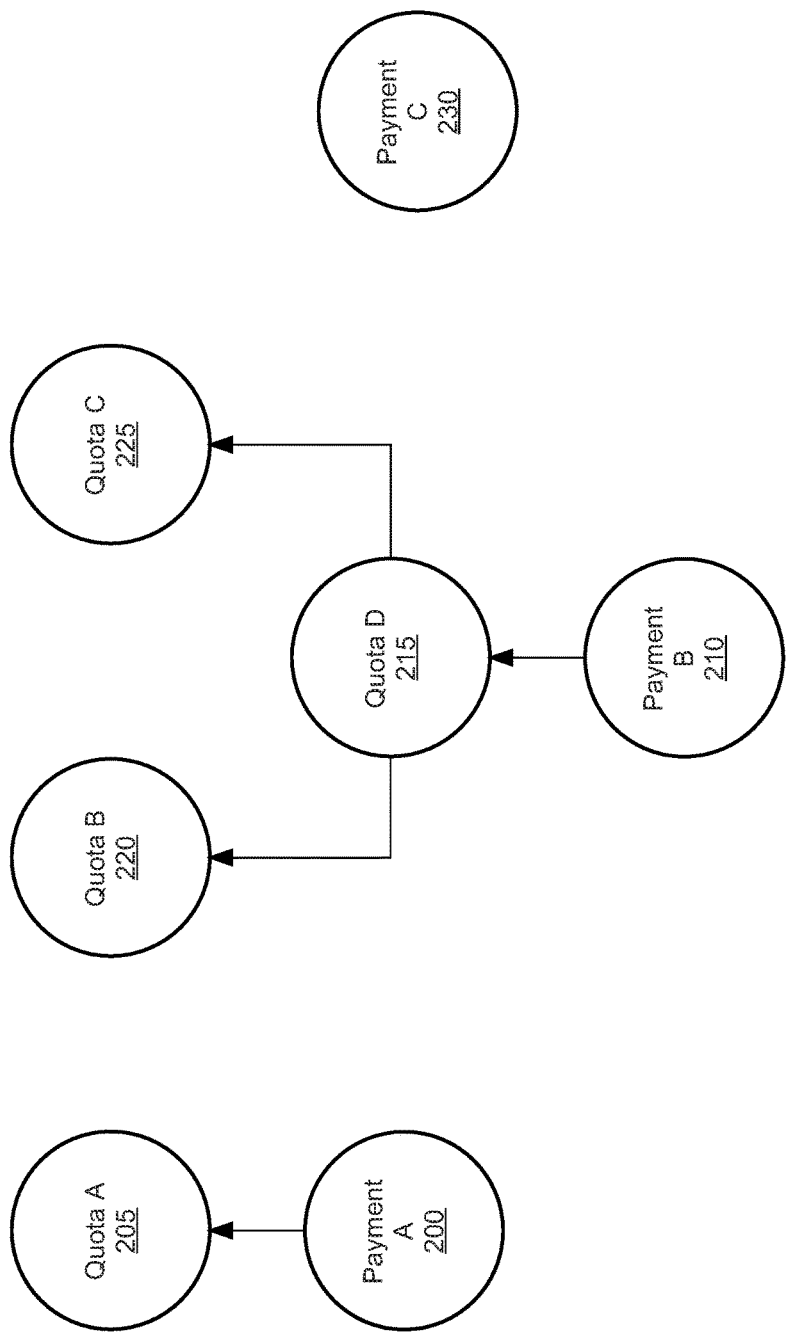
FIG. 2 illustrates an example execution graph, in accordance with an embodiment.

An example graph 125 is shown in more detail in FIG. 2. While the graph of FIG. 2 relates to payments and quotas, graphs may be related to any context or type of calculation, and the invention should not be limited to the example shown in FIG. 2. The graph shown in FIG. 2 has been generated based on the data provided by a client, such as indicating or providing the calculations, reports, formulas, or rules to be performed. The graph of FIG. 2 is a graph for a specific user, and the graph includes three different sets of nodes, all relating to payments and quotas. The first set of nodes includes two nodes: payment A 200 and quota A 205. As shown in FIG. 2, there is an edge between payment A 200 and quota A 205, indicating that payment A 200 is dependent on quota A 205. Thus, when executing these two nodes, quota A 205 would need to be executed first. Likewise, payment B 210 is dependent on quota D 215, and quota D 215 is dependent on quota B 220 and quota C 225. In contrast, payment C 230 is not dependent on any other node. While only dependencies on other nodes of the same graph are shown in FIG. 2, nodes may be dependent on graphs of other users as well. For example, a manager may be compensated based on how well his or her employees perform, and thus a node in the manager's graph may be dependent based on a node of, or an entire graph of, another user.

Each node in FIG. 2 has a context in and a context out. In other words, each node is provided or has the data to perform a calculation and the instructions or code for how to perform the calculation, and after execution produces a result to the calculation. As an example, if a node were provided instructions for summing two variables, and the context included 5 and 10 as the data, the context in would include the instructions for summing a variable, and the data 5 and 10. The context out would include at least the result—15, and may be used as a context in for a subsequent node.

The graph of FIG. 2 may be executed in parallel. For example each set of nodes (200, 205), (210, 215, 220, 225), and (230) may be executed simultaneously. Likewise, quota B 220 and quota C 225 could also be executed simultaneously as quota B 220 is not dependent on quota C 225. Similarly, the user graph shown in FIG. 2 could be executed in parallel with user graphs of other users. Thus, multiple levels of parallelism that may be used, on any number of different computing devices, instances, threads, cores, etc.

Returning to computing system 105, computing system 105 executes process orchestrator 110. Process orchestrator is programmed or configured to perform steps or actions associated with or needed by the invention described herein. Some such steps may be receiving and storing client data in distributed data store 130. Receiving and storing client data may be performed in any manner at any point in time. The receiving and storing may be performed by any suitable component, including components not shown in FIG. 1, such as a database connector or management system, or another application or module. For example, JDBC, ODBC, SPARQ, or other interface or file system may be used to communicate with and store data in distributed data store 130.

In one embodiment, process orchestrator 110 is programmed or configured to perform pre-processing of graphs. Broadly, preprocessing interacts with the data stores or databases, and collects all data required for constructing the context and graph nodes. Preprocessing is itself executed as a graph which takes in an empty context and emits a context with a list of graphs that will be processed by the execution step. Pre-processing of graphs may include receiving calculation requests, identifying and retrieving data needed for a calculation request, storing data in memory, and generating graphs for calculation requests. Process orchestrator 110 may receive calculation requests from clients in any format or manner, and at any point of time. The requests may specify any type or amount of calculations to be performed, from a simple one step calculation to complicated calculations involving hundreds or thousands of different steps. For example, a simple calculation may be performing payroll for a single employee, while performing payroll for 100,000 employees is an example of a complicated calculation. Calculations are not limited to payroll or payment related calculations, and the calculations may relate to any type of data.

In one embodiment, process orchestrator 110 is programmed or configured to identify and retrieve data needed for a calculation request. Data needed for a calculation request may be included or identified in the request itself, such as by providing a description, link, pointer, attachment, etc. The identified data may reside at any suitable location, such as on one or more nodes of distributed data store 130.

In one embodiment, process orchestrator 110 is programmed or configured to store retrieved data in memory. The retrieved data is stored in an in-memory data store known as the context. By storing the retrieved data in-memory, slow, expensive data store accesses may be minimized. In other words, when graphs are executed, no data store accesses are needed. Rather, all needed data is already stored in the context, and thus readily accessible in memory. The retrieved data may be stored in any manner or format, and may be of any size. Examples of data that may be retrieved include, but are not limited to: rules, formulas, user data, metadata, salary information, credits, payment information, tables, quotas, orders, lists, code, and calendars.

In one embodiment, process orchestrator 110 is programmed or configured to generate graphs for calculation requests. Graphs may be generated in conjunction with graph executor 115. The graphs may be generated using any of the information contained in the context. The graphs, as discussed above, include the instructions for processing or performing a portion of the calculation that has been requested as well as the data needed for the portion to be performed by the specific node of the graph. The graph may be generated in any format, such as a list or map of nodes. Any number of graphs may be generated. For example, the pre-processing step itself may utilize a graph that is executed to generate the list of graphs that will be executed to complete the request. Generally, one graph is generated per user or entity, and that graph may have any number of nodes forming any number of distinct groupings.

In one embodiment, process orchestrator 110 is programmed or configured to perform an execution of graphs step. Execution of graphs may include determining where to execute graphs or nodes of graphs, and communicating with graph executor 115 to perform the execution. In one embodiment, process orchestrator 110 may determine where to execute particular graphs or nodes of graphs based on what device or node of the computing system has the necessary data stored in-memory. Additionally, the determination of where to execute a particular graph or node may be made based on an estimated time to complete the calculation, the load on or expected load of computing system 105, a desired time of completion of the request, or based on any other factor.

The determination by process orchestrator 110 of where to execute particular graphs or nodes may take advantage of the multiple levels of parallelism enabled by the invention. In particular, individual use or entity graphs may be executed in parallel, and/or individual nodes within a specific graph may also be executed in parallel. Process orchestrator 110 may launch any number of different computing instances or utilize any number of virtual machines or computing devices, such as through using a public or private cloud, to execute the graphs. Once the determination is made, process orchestrator 110 communicates with graph executor 115 and instructs graph executor 115 to execute the graph or graphs.

In one embodiment, process orchestrator 110 is programmed or configured to perform post processing of graphs. Post processing of graphs may include displaying results and performing other actions. The results may be displayed in any manner and in any form. For example, the results may be displayed using charts, graphs, tables, etc. Optionally, a notification or alert may be sent in the post processing steps, so that a user knows that their request has been completed. The notification or alert may be sent in any format using any suitable manner. Other actions may be performed as well, such as copying or storing the results to additional locations or devices, or any other steps or actions as desired.

Computing system 105 executes graph executor 115. Graph executor 115 is programmed or configured to execute graphs. Graph executor 115 receives a list or map of graphs from process orchestrator 110 to execute and, using the information available from the context associated with the graph, executes the graph. Graph executor 115 may traverse the graph as needed to identify the proper order in which to execute the node or nodes of the graph, or may perform any other additional steps as needed. Once completed, graph executor 115 returns a context that includes the result of executing the graph. Any number of graphs may be executed by graph executor 115, and the graphs or nodes may be executed in any suitable order.

4. Example Functional Implementation

Figure 3:
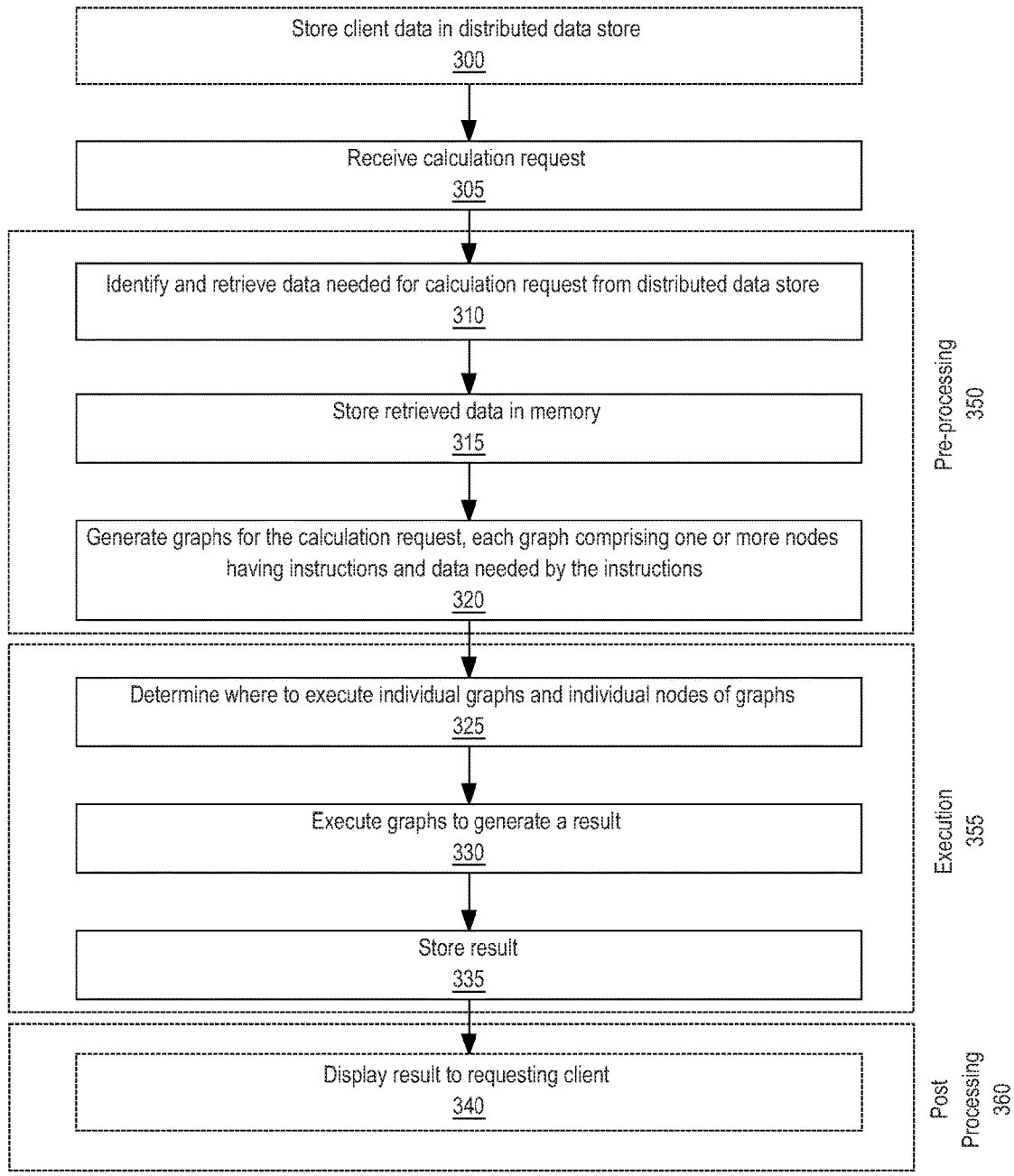
FIG. 3 illustrates a programmable algorithm or method for a generalized flexible calculation framework in accordance with an embodiment.

FIG. 3 illustrates an example programmable algorithm or method for improving the speed of data analytics.

Although the steps in FIG. 3 are shown in an order, the steps of FIG. 3 may be performed in any order, and are not limited to the order shown in FIG. 3. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure is a guide, plan or specification of an algorithm for programming a computer to execute the functions that are described.

In step 300, client data is stored in a distributed data store. Client data may be stored in any format using any suitable method. Data for any number of clients may be stored in the distributed data store. As needed, the client data may be replicated and/or copied to ensure that a copy or version of the data is always available via the distributed data store. The client data may be stored or updated at any point of time, even as the subsequent steps of FIG. 3 are being performed.

In step 305, a calculation request is received. The request may be received from any suitable source, such as a client device, user, administrator, etc., and may be received in any format or manner. The request may be received at any time, and may identify the calculations to be performed, the data needed, metadata, or other information necessary to allow a calculation(s) identified in the request to be performed.

In step 310, data needed for the calculation request is identified and retrieved from the distributed data store. The data needed may be identified in any suitable manner, such as by processing or analyzing the calculation request to determine the steps that will be performed, and the data needed by those steps. Alternatively, the data may be specified partially, or completely, in the request itself. The data may be retrieved from the distributed data store in any manner.

In step 315, the retrieved data is stored in memory. The retrieved data is stored in the context, which is an in-memory data store. The retrieved data may be stored in any format in the context. The retrieved data may be stored in the same format from which it was retrieved from the distributed data store. Alternatively, the data may be processed into a different format, such as by decompressing or otherwise modifying the format of the data as needed.

In step 320, graphs are generated for the calculation request. Each graph has one or more nodes, and each node includes instructions or code needed to perform at least a portion of a calculation, as well as the data needed for the calculation. The data is stored in the context. Any number of graphs may be generated. Generally, one graph is generated per user or entity. For example, if a task is to calculate compensation for 200 employees, then 200 graphs may be generated—one for each employee. Graphs may be of any size, and may have any type of dependencies, as determined by the data or instructions. For example, nodes within a graph may be dependent on other nodes of the same graph, or may be dependent on nodes of another graph. As part of generating graphs for the calculation request, one or more graphs may be generated in pre-processing and themselves executed to generate the list of graphs.

In step 325, a determination is made regarding where to execute individual graphs and/or individual node of graphs. Because the graphs contain the instructions or code and data necessary to execute, a high degree of parallelism is possible. Thus, any graph or node of a graph that is not dependent on another node or graph may be executed in parallel on any computing device or instance. Even graphs or nodes that have dependencies may be executed in parallel, depending on the dependencies present. Generally, determinations of where to execute graphs or nodes may be made based on any suitable factor or factors including, but not limited to: available computing power, current or expected resource load or usage, cost, time, speed, efficiency, location of data, security considerations, proximity or physical location, user preferences, etc. Once the determination is made, instructions may be sent to the computing instances or computing devices as needed in any format or manner.

In step 330, graphs are executed to generate a result. Any number of graphs may be executed in any order, using any number of computing instances or computing devices, as determined in step 325. The graphs are executed using the instructions or code and data identified in each node of each graph.

In step 335, the result is stored. The results may be stored temporarily in memory. Generally, the results are saved back into the distributed data store, but the results may be stored in another location or may be copied to multiple locations as needed. The storing of step 335 may be included as a node of a graph and performed during execution of a graph.

In step 340, the results of a calculation are displayed to a requesting client. The results may be displayed in any manner or format, on any suitable device. For example, the results may take the form of one or more charts, graphs, tables, etc. To display the result set to the client, the result set may be sent to the client in any manner or format.

As shown in FIG. 3, the method can be broken down into three broad steps: pre-processing 350, execution 355, and post processing 360. The dotted lines indicate that pre-processing 350 includes steps 310, 315, and 320, while execution 355 includes 325, 330, and 335, and post processing 360 includes step 340. No data store access is necessary to perform execution 355 because all needed data and instructions or code were already loaded into memory during pre-processing 350. Additional or fewer steps may be included in the three broad steps of FIG. 3, and the invention should not be limited to the specific example shown in FIG. 3.

Using the above method, a generalized, flexible calculation framework may be realized. The framework allows for a data-driven approach that is customizable by each user or client by allowing the user or client to execute any calculations that they may define. This makes the calculation framework flexible and frees clients from the limited choices of other calculation frameworks. Additionally, generating per-user or per-entity graphs has historically been challenging due to batch processing of data and other constraints imposed by less flexible calculation frameworks. But, by constructing graphs as described above, the graphs may be generated on a per-user or per-entity basis. This allows for easy parallel execution of graphs or nodes of graphs. This results in decreased processing time, less usage of computing power, lower memory requirements, and generally improved computing efficiency and a better client experience. Further still, the above described generalized, flexible calculation framework may be deployed across a public or private cloud. In particular, using a public cloud allows for rapid increases in the number of computing instances or computing devices for execution of graphs, and allows for a large amount parallel execution, made possible by the per-user graphs, to be performed.

5. Example Calculation

Figure 4:
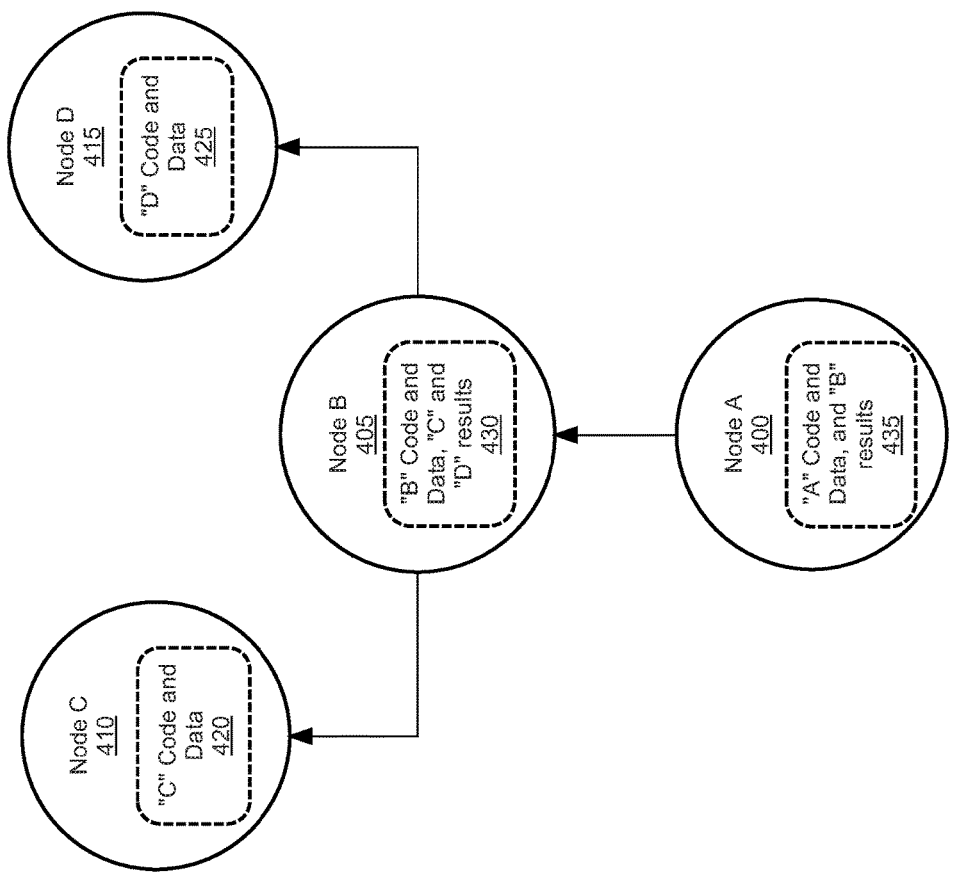
FIG. 4 illustrates an example calculation using a generalized flexible calculation framework.

FIG. 4 illustrates an example of a calculation using the techniques otherwise described herein. The example of FIG. 4 is simplified for purposes of clarity, and other embodiments may execute calculations of a magnitude and complexity greater than the specific example shown in FIG. 4.

In FIG. 4, a user graph is shown graphically in terms of polygons and lines that correspond to digitally stored nodes and edges. The user graph of FIG. 4 is but one of many user graphs that will be executed as part of a calculation request, but for the sake of simplicity the other graphs are not depicted. The particular user graph of FIG. 4 is a high priority graph, and will be executed as quickly as possible, using parallel execution. The user graph includes 4 nodes: node A 400, node B 405, Node C 410, and Node D 415.

Node A 400 is dependent on Node B 405, and Node B 405 is dependent on Node C 410 and Node D 415. Each node includes the context associated with the node in the dotted boxes 420, 425, 430, and 435.

Due to the high priority of the user graph, a determination is made that node C 410 will execute using a first computing instance, node D 415 will execute using a second computing instance, and that node B 405 and node A 400 will execute on a third computing instance, to ensure that the calculation is performed as fast as possible. Thus, when the user graph is executed, the "C" code and data 420 for node C 410 is executed by the first computing instance. The result of the execution are "C" results, which are immediately sent to the third computing instance. Simultaneously, the second computing instance is executing Node D 415 using "D" code and data 425 to generate the "D" result, which is also immediately sent to the third computing instance.

Upon receipt of both the "C" and "D" result, Node B 405 is executed by the third computing instance using the "B" code and data, and the "C" and "D" results 430. This generates a "B" result, which is available for use by Node A 400 (on the same third computing instance). Then, Node A 400 is executed using the "A" code and data and the "B" results 435, to generate a final result for the user graph.

The embodiments described herein provide a direct improvement to computer systems and computer technology. By allowing for large amount of parallel processing a higher calculation throughput may be achieved, thereby reducing the time needed to perform calculations. Additionally, the amount of memory, network bandwidth, and power usage may be reduced. In some embodiments, disk I/O is reduced by loading needed data into memory as described. The reduction in disk I/O reduces the cost and time needed to perform calculations. This may be particularly advantageous or noticeable when the disk itself is networked, such as when using a public cloud service (e.g. Elastic Block Store (EBS) on Amazon Web Services (AWS)).

Further, the embodiments described herein offer an improvement in a computing system, allowing the computer system to perform functions that were previously impossible to perform, or were previously performed so slowly that it was not feasible to perform. Additionally, the embodiments described herein describe a technical solution to a technical problem that is rooted in computer systems and the use of networked computers. These advantages and others described throughout this specification are clear improvements over existing systems that are unable to provide these improvements or advantages.

6. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
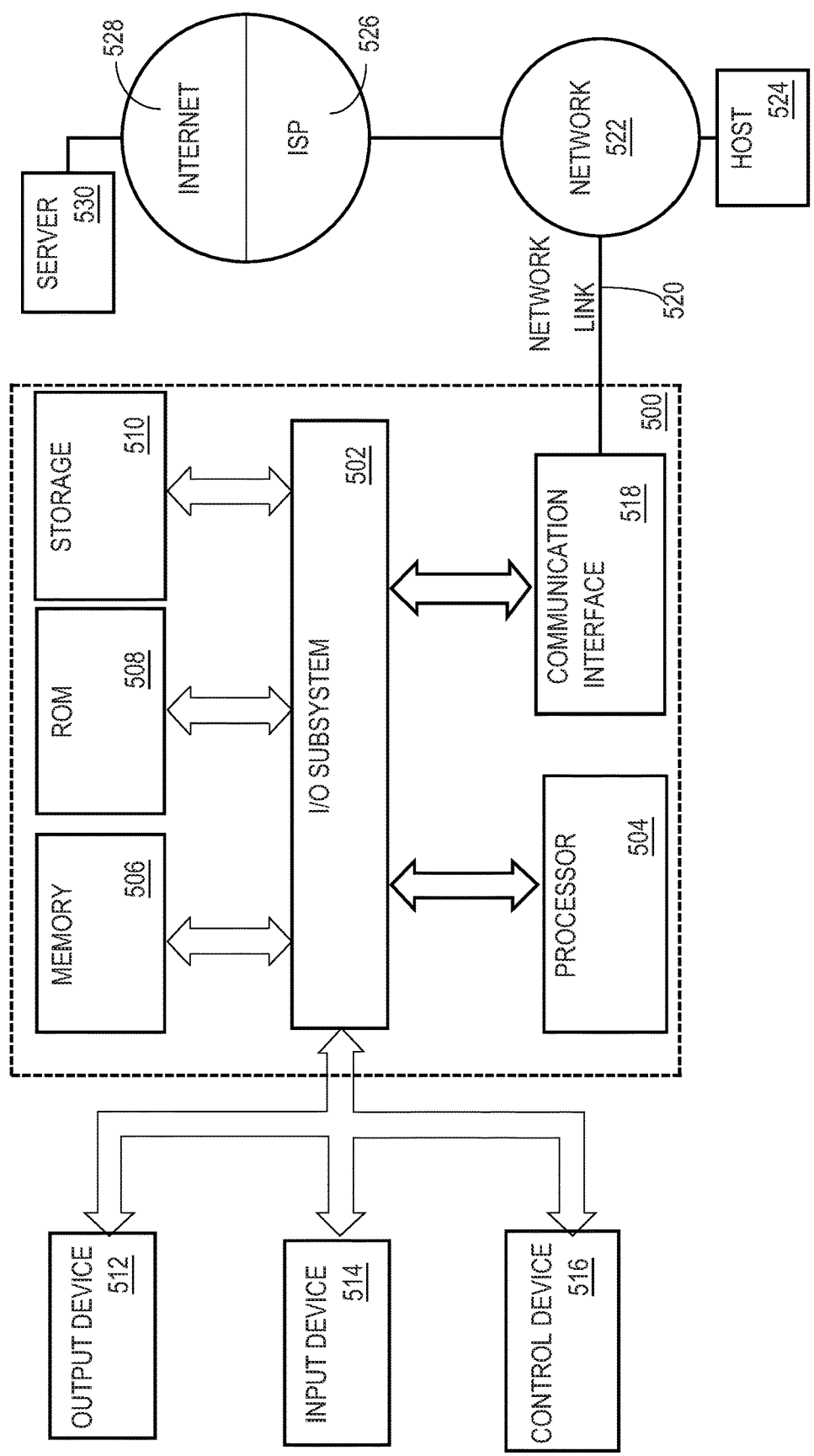
FIG. 5 illustrates a computer system upon which an embodiment may be implemented.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM, and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

7. Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A data processing method providing an improvement in the efficiency of use of CPU, memory and storage resources in defining and executing complex digital numeric data calculations by computer, the method comprising:
receiving, from a client computing device and at a computing system, a request to perform a digital numeric calculation by computer;
identifying, based on the request, a plurality of stored digital data items that are needed to perform the calculation and retrieving the plurality of data items from a digital data store comprising one or more hard disk drives hosting a MapR JSON-based data store, the computer and data store comprising a multi-tenant system in which client data for different entities is stored together but subject to access control procedures;
storing, in digital computer memory, the plurality of data items;
generating a plurality of graphs for an in-memory calculation and storing the graphs in the digital computer memory, each graph of the plurality of graphs is for a particular entity among a plurality of different entities that are associated with tenants of a multi-tenant digital computer system, each of the graphs associated with a different user account, the graphs comprising a plurality of subsets, each of the subsets comprising two or more graphs for a particular entity, the user accounts corresponding to users who are employees of entities including the particular entity, wherein each graph of the plurality of graphs comprises one or more nodes, each node comprising executable program instructions to perform at least a portion of the calculation and at least one data item of the plurality of data items needed by the portion of the calculation, each edge of a graph representing a dependency of an associated node or nodes and guidance on an order of execution of nodes, the generating resulting in a digitally stored in-memory list of graphs;
traversing the in-memory list and using a computer-implemented graph traversal algorithm and executing each of the plurality of graphs based on input from an in-memory context to generate a result value for the calculation that is stored in the in-memory context by traversing the graph and processing each node using the instructions of the node and the at least one data item of the node, including performing the executing without accessing the data store;
the in-memory context including instructions or code to perform the calculation of the graph;
storing, in the data store, the result value.

2. The method of claim 1, wherein two or more nodes of the one or more nodes for a particular graph are connected by edges that represent a dependency between the two nodes.

3. The method of claim 2, wherein a node of the one or more nodes is dependent on another graph.

4. The method of claim 1, further comprising:
determining a first graph of the plurality of graphs will execute on a first computing device and a second graph of the plurality of graphs will execute on a second computing device;
executing, in parallel, the first graph by the first computing device and the second graph by the second computing device.

5. The method of claim 1, further comprising:
determining a first node of a particular graph of the plurality of graphs will execute on a third computing device and a second node of the particular graph of the plurality of graphs will execute on a fourth computing device;
executing, in parallel, the first node by the third computing device and the second node by the fourth computing device.

6. The method of claim 1, wherein the data store is a distributed data store.

7. The method of claim 1, wherein the computing system comprises a public cloud.

8. The method of claim 1, further comprising:
causing displaying, on the client computing device, the result.

9. A system comprising:
one or more server computers communicatively connected to a data store, the one or more server computers comprising one or more processors and electronic digital memory storing one or more sequences of instructions which, when executed by the one or more processors, cause the one or more processors to perform:
receiving, from a client computing device and at a computing system, a request to perform a digital numeric calculation by computer;
identifying, based on the request, a plurality of stored digital data items that are needed to perform the calculation and retrieving the plurality of data items from a digital data store comprising one or more hard disk drives hosting a MapR JSON-based data store, the computer and data store comprising a multi-tenant system in which client data for different entities is stored together but subject to access control procedures;
storing, in digital computer memory, the plurality of data items;
generating a plurality of graphs for an in-memory calculation and storing the graphs in the digital computer memory, each graph of the plurality of graphs is for a particular entity among a plurality of different entities that are associated with tenants of a multi-tenant digital computer system, each of the graphs associated with a different user account, the graphs comprising a plurality of subsets, each of the subsets comprising two or more graphs for a particular entity, the user accounts corresponding to users who are employees of entities including the particular entity, wherein each graph of the plurality of graphs comprises one or more nodes, each node comprising executable program instructions to perform at least a portion of the calculation and at least one data item of the plurality of data items needed by the portion of the calculation, each edge of a graph representing a dependency of an associated node or nodes and guidance on an order of execution of nodes, the generating resulting in a digitally stored in-memory list of graphs;

traversing the in-memory list and using a computer-implemented graph traversal algorithm and executing each of the plurality of graphs based on input from an in-memory context to generate a result value for the calculation that is stored in the in-memory context by traversing the graph and processing each node using the instructions of the node and the at least one data item of the node, including performing the executing without accessing the data store;

the in-memory context including instructions or code to perform the calculation of the graph;

storing, in the data store, the result value.

10. The system of claim 9, wherein two or more nodes of the one or more nodes for a particular graph are connected by edges that represent a dependency between the two nodes.

11. The system of claim 10, wherein a node of the one or more nodes is dependent on another graph.

12. The system of claim 9, further comprising:

determining a first graph of the plurality of graphs will execute on a first computing device and a second graph of the plurality of graphs will execute on a second computing device;

executing, in parallel, the first graph by the first computing device and the second graph by the second computing device.

13. The system of claim 9, further comprising:

determining a first node of a particular graph of the plurality of graphs will execute on a third computing device and a second node of the particular graph of the plurality of graphs will execute on a fourth computing device;

executing, in parallel, the first node by the third computing device and the second node by the fourth computing device.

14. The system of claim 9, wherein the data store is a distributed data store.

15. The system of claim 9, wherein the computing system comprises a public cloud.

16. The system of claim 9, further comprising:

causing displaying, on the client computing device, the result.

* * * * *